W. N. ALLAN.
VEHICLE WHEEL.
APPLICATION FILED AUG. 13, 1917.
1,297,052.
Patented Mar. 11, 1919.
2 SHEETS—SHEET 1.
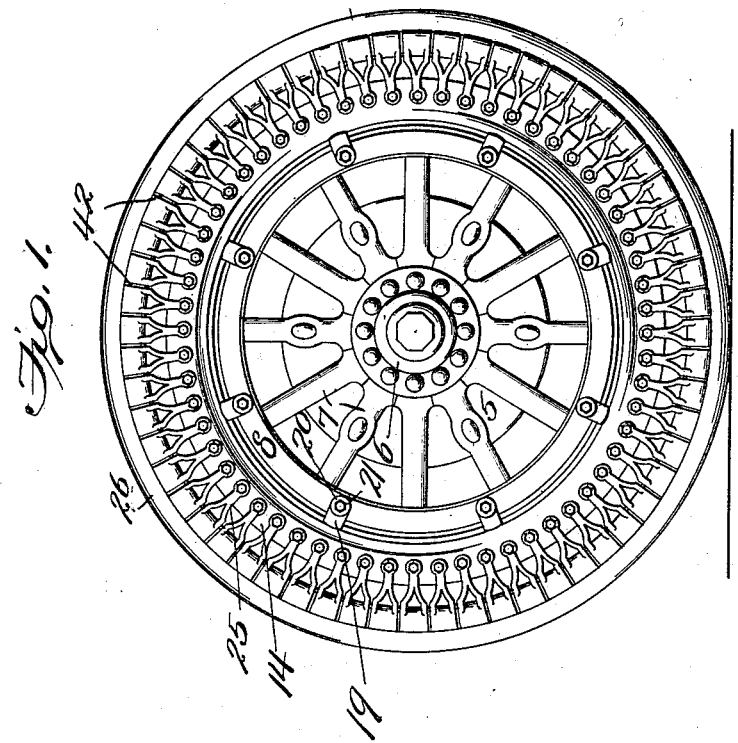
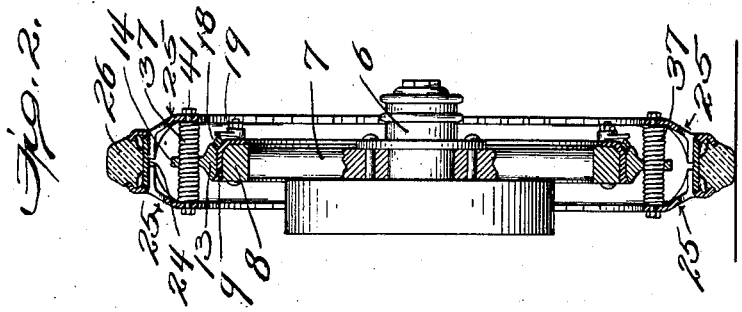
WITNESSES:
INVENTOR
William N. Allan
BY
James L. Norris
ATTORNEY W. N. ALLAN.
VEHICLE WHEEL.
APPLICATION FILED AUG. 13, 1917.
1,297,052.
Patented Mar. 11, 1919.
2 SHEETS—SHEET 2.
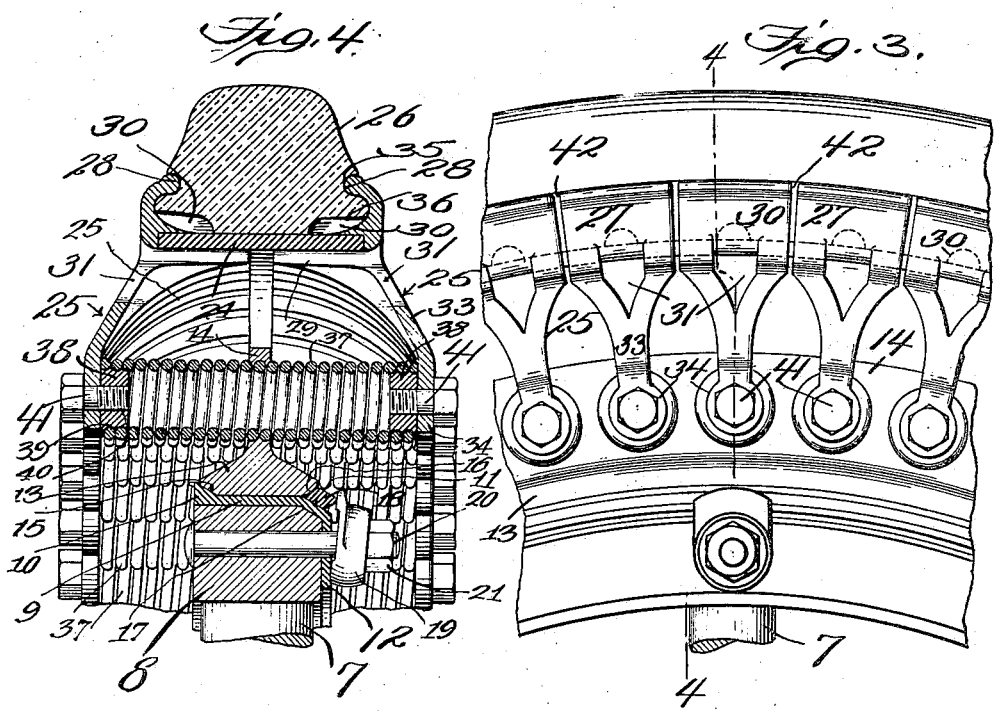
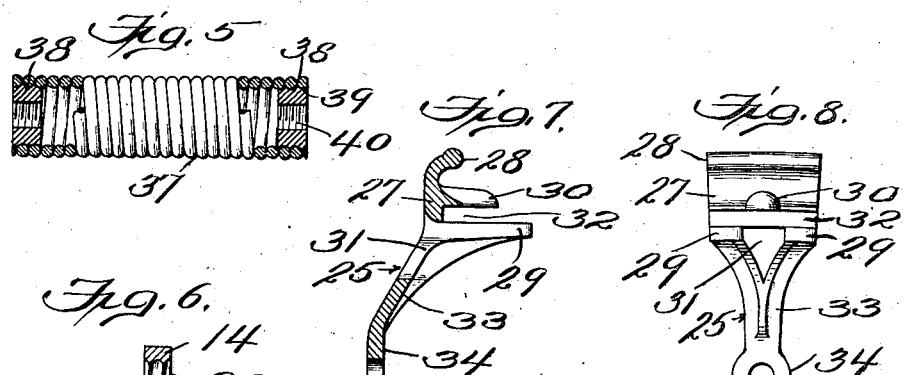
WITNESSES:
INVENTOR
William N. Allan
BY
James L. Norris,
ATTORNEY

UNITED STATES PATENT OFFICE.

WILLIAM N. ALLAN, OF SAN ANTONIO, TEXAS.

VEHICLE-WHEEL.

1,297,052.

Specification of Letters Patent. Patented Mar. 11, 1919.

Application filed August 13, 1917. Serial No. 186,022.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The present invention embodies features of improvement relatively to the construction of tire disclosed in my pending applications, Serial No. 159,702, filed April 4, 1917, and that filed of even date herewith. As in my previous structures, one of the objects of the present improvement is to dispense with all present improvement is to dispense with all fastening bolts, rivets, or other penetrating devices in so far as practicable, and particularly in connection with that part of the tire which carries the tread device, and thereby avoid weakening the parts of the tire as much as possible and to facilitate the assemblage of the tire members in strong operative relation. A further object of the invention is to provide a novel form of treadholding device and to embody as a part of the latter and of the tire a resilient metal band completely encircling the tire, and having a solid tread device or member bearing thereon and of such material that it will have a yielding action, said solid yielding tread device together with the band permitting the tire as a whole to compensate for and readily conform to irregularities of road surface over which the tire may travel to avoid bumps or sudden jolts, the improved tire operating in this particular in all respects similar to the ordinary pneumatic tire which flattens out and shapes itself to the irregularities of a road surface. In the present tire construction also springs are arranged in transverse position within the tire as in my pending applications, above noted, and said springs are adapted to carry an equal part of the load, both as to actual weight and driving stress or strain thereon, and also to permit a comparatively greater travel of the tire relatively to a minimized expansion of the springs. The present improved tire also embodies a series of springs arranged so as to work freely in any direction and compensate for side stress as well as angular positions to accommodate variations in the road surface over which the wheel bearing the tire may move. In the present improved construction, also springs are terminally held in such manner as to overcome any tendency to crystallization or breakage of any part of the springs and to provide for more ready removal or repair or substitution of the springs than in the construction disclosed in my earlier filed pending application, the springs in the present instance having threaded bushings inserted in the ends thereof and adapted to be secured by screw bolts engaging the said bushings, the bushings and the springs being applicable and removable as a unit. In the present improvement also the operation of the springs in the tire is noiseless and the springs are closely coiled to give them an equality of spring action on opposite sides of the holding means therefor.

The invention therefore consists in the preferred construction and arrangement of the several parts which will be more fully hereinafter described and claimed.

In the drawings:—

Figure 1 is a side elevation of a wheel embodying the features of the invention.

Fig. 2 is a transverse central section of the improved wheel.

Fig. 3 is an enlarged side elevation of a portion of the wheel and tire.

Fig. 4 is a transverse vertical section taken in the plane of the line 4—4, Fig. 3.

Fig. 5 is a side elevation of one of the springs broken away and showing in section at opposite extremities and illustrating the attaching bushings also shown in section in the opposite ends of the spring.

Fig. 6 is a detail sectional view of a portion of the wheel rim showing one of the screw seats therein for engagement with one of the springs.

Fig. 7 is a sectional view taken through one of the tread device engaging clips.

Fig. 8 is a detail elevation looking toward the inside of one of the tread device engaging clips.

The numeral 5 designates a wheel embodying a hub 6 and spokes 7 radiating from the hub to the felly 8 and provided with a metal rim 9 having a beveled side edge 10 projecting outwardly, the opposite side edge being struck inwardly at an angle, as at 11, and continued into a flange 12 extending over a portion of one side of the felly and held fixed to the latter. The felly as shown is preferably made of wood, but it is obvious that it could be constructed of metal and the periphery thereof shaped to correspond to the contour of the rim 9. In other words, the felly and the rim may be made in either one or two parts, the metal rim 9 as shown obviating wear on the felly when the latter is constructed of wood. The wheel is also provided with a removable rim 13 formed or provided with an outwardly projecting annular flange 14 centrally disposed with relation to the said removable rim. The removable rim 13 is held on and surrounds the fixed rim 9 and the base thereof is formed with opposite bevels, as at 15 and 16, the bevel 15 fitting snugly upon the enlarged beveled side edge 10 of the rim 9 and the bevel 16 coöperating with the downward bevel 11 of the rim 9 to form a seat 17 in which a locking or keying ring 18 is removably held by flange collars or washers 19 engaged by bolts 20 extending through the felly 8, the washers 19 being held in snug engagement with the ring 18, as shown by Fig. 2, through the medium of nuts 21. It will therefore be understood that the rim 13 with its flange 14, together with the improved tire may be readily withdrawn from or applied over the felly 8 and rim 9 of the wheel 6 and when in applied position will be positively held against displacement or loose movement. At regular intervals the flange 14 is formed with openings 22 having screw threaded or corrugated walls 23.

The improvement embodies a resilient tire organization held or supported by the flange 14 and is removable from and applicable to the felly 8 or the rim 9 of the latter with the rim 13 and said flange 14 as a whole, or, the said tire organization may be partially dismembered for repair and substitution of elements thereof without displacing the rim 13 and its flange 14 from applied position on the wheel. This tire organization in the present instance embodies an endless spring band 24 and a plurality of tread device engaging and attaching clips or connecting members 25 which carry a solid rubber tread device 26 which has bearing on the spring band 24. The tread device 26 may be formed of any suitable material adaptable for the purpose and in some instances may be of a particular kind of wood, wood sections or a composition of materials. Each clip or tire device or connecting member 25 is provided with an outer head 27 having an inturned or inwardly extending bead 28, a pair of inwardly projecting divergent fingers 29 and a counteracting finger 30 centrally disposed above or over the space 31 between the fingers 29 as clearly shown by Figs. 7 and 8. Between the fingers 29 and 30 a seat 32 is provided for the reception of the side edge portion of the spring band 24. From the head 27 each clip inclines outwardly and downwardly in the form of a shank 33 and terminates in a vertically straight eye 34 at its lower end. The tread device 26 at opposite sides is formed with grooves 35 to receive the inwardly extending bead 28 of the head 27 of the clip, the said tread device adjacent to its base being provided with a recess or seat 36 to receive the finger 30 as shown in Fig. 4. It will therefore be seen that the divergent fingers 29 are under the spring band 24 and the fingers 30 over said band and in engagement with the tire device 26 so that the said band and tire device are held against separation, the fingers 29 and 30 acting in opposition particularly when the band 24 is flexed inwardly by pressure thereon exerted through the tire device and during such inward pressure or flex of the spring band 24, the fingers 30 are firmly forced into the tire device or act to more securely and positively engage the tire device and prevent the least tendency to displacement thereof relatively to the spring band and the clips. The object of the spring band 24 is to permit the tire to conform to irregularities in a road surface without the least bump or jar and similarly to the conformation of a pneumatic tire to inequalities of a road surface without lifting the weight of the entire rim over the inequality. The eyes 34 of the clips 25 are connected to the opposite extremities of a plurality of springs 37 which extend fully across the interior of the rim and are closely coiled and threaded through the openings 22 of the flange 14 of the removable rim 13 by rotation thereof similar to the insertion of ordinary screw devices and without jamming or contracting the spring coils and particularly at the portions thereof in engagement with the said threaded openings 22. The springs 37 are continuous from end to end and through the medium of the flange 14 are centrally engaged and removably connected to the rim 13. The opposite terminals of each spring 37 have bushings 38 fitted therein and provided with screw threaded surfaces as at 39 with which the spring coils engage, the outer ends of the bushings being flush with the terminal coils of each spring. Each bushing 38 has a central screw threaded bore 40 and inserted in these bores are bolts 41 which are also inserted through the eyes 34 of the clips and by this means the clips are given a resilient connection at their inner extremities. The springs 37 connected to the eyes 34 of the clips 25 provide a resilient securing means for the said clips and resist outward spreading or other irregular movement of the clips and also cause the latter to return to normal condition under all conditions of operation of the tire. The springs are practically disposed in a chamber of which the clips form the sides, the chamber being fully open between the shanks of the clips and also between the divergent fingers 29 of the clip. It will also be seen that the heads 27 of the clips have spaces 42 between the ends thereof which provide for an increased flexibility of the tire by avoiding a jam of the clips during the movement of the parts of the tire and furthermore this spaced arrangement and the pivotal action of the clips relatively to the bolts 41, which is due to the engagement of the eyes 34 with smooth portions of the bolts 41, insures a conformation of the parts of the tire or a shifting movement thereof, when a part of the tire is under tractive and weight stress against the resistance of the spring band 24 and the plurality of springs 37, this shifting movement of the parts of the tire including the clips 25 being regularly effected in varying degrees in opposite directions circumferentially of the tire when portions of the latter are under pressure and weight stress. This is particularly true when the tread device 26 engages and moves over a road surface projection or passes through and over a depression in the road surface and also at such other times when the tread device engages other road surface inequalities. It will also be observed that ample space is given for a free operation of the springs or to provide for intermediate bending and relaxation of the springs without liability of the springs coming into contact with the adjacent parts of the tire and without the least longitudinal movement of the springs bodily. The springs are also held against loose rattling movement and are therefore noiseless in their operation, and one of the main advantages of the present construction is the material increase in resilience due to the continuous construction of the springs or their unbroken extent through the flange 14 of the rim 13 and the coöperation therewith of the spring band 24. A still further advantage of the present improvement is that the resilient effect of each spring is obtained from the center thereof by reason of the continuous structure of each spring and the securement thereof at opposite ends, the several springs resiliently bending at their centers during the operation of the tire. Moreover, the springs and clips may be readily detached and reset or replaced, and the springs moreover are positively held at their ends through the use of the bushings 38 which are preferably first applied to the springs and then jointly with the springs inserted in the tire ready to receive the bolts 41. The improved tire embodies in its organization a demountable rim and tire, or the rim 13 having the spring engaging flange 14 with the remaining parts of the tire are simultaneously removable and therefore the said tire as a whole may be easily applied to or removed from a wheel.

What I claim is:—

1. A tire comprising a removable rim, yielding tread-holding means embodying a spring band, a tread device in the said tread-holding means resting on the outer side of said band, and a plurality of transversely arranged springs located inwardly a distance from the spring band and connected to the side portions of the tread-holding means and also to the said removable rim.

2. A tire comprising a removable rim, resilient tread-holding means embodying an outer spring band and also provided with a tread device, and counteracting transversely arranged yielding connections between inner portions of the tread-holding means and the said removable rim.

3. A tire comprising a removable rim, tread-holding means embodying a spring band and a plurality of movable tread device engaging members, a plurality of transversely extending springs individually connecting the inner extremities of opposing members, and a tread device supported on the band and held by the outer extremities of said members.

4. A tire comprising a removable rim, tread-holding members automatically expansible and contractible and embodying a spring band between the outer extremities of said members, the inner extremities of the members having resilient connections, and a tread device mounted between the said members against the band.

5. A tire comprising a removable rim, tread-holding means embodying an outer spring band and yielding side members embracing the edges of the band and having transversely extending springs connected to their inner extremities and also engaging and connecting the removable rim to the said members, and a solid tread device mounted on the band between and engaged by the outer extremities of the said members.

6. A tire having a holding rim composed of a resilient band and movably mounted resiliently connected side members engaging the band, and a tread device mounted in said rim against the band between the side members, the said tread device being solid and operable to conform to road inequalities in a manner similar to a pneumatic tire.

7. A tire comprising a removable rim, yielding tread-holding means embodying a spring band and a plurality of movably mounted clips with outer counteracting fingers extending inwardly and supporting the said band between them, and a tread device mounted on the band between the clips and also engaged by a portion of the fingers.

8. A tire comprising a removable rim, tread-holding means, and a solid tread device in said means, the tread-holding means embodying a continuous resilient device against which the tread device has bearing and counteracting resilient means associated with said continuous resilient device to operatively retain the tread and resilient devices in place and laterally yield and move when the continuous resilient device is subjected to pressure tending to flatten the same and contribute to the sensitive flexibility of the tire as a whole.

In testimony whereof I have hereunto set my hand in presence of two subscribing witnesses.

WILLIAM N. ALLAN.

Witnesses:
  CHAS. S. HYER,
  JAMES L. NORRIS.